United States Patent [19]

Green

[11] 3,869,085

[45] Mar. 4, 1975

[54] CONTROLLED CURRENT VECTOR GENERATOR FOR CATHODE RAY TUBE DISPLAYS

[75] Inventor: Paul F. Green, Glendale, Ariz.

[73] Assignee: Sperry Rand Corporation, New York, N.Y.

[22] Filed: Dec. 17, 1973

[21] Appl. No.: 425,578

[52] U.S. Cl. ................ 235/198, 315/22, 340/324 A

[51] Int. Cl. ............................................. G06f 3/14

[58] Field of Search .................... 235/198, 197, 151; 340/324 A; 315/18, 22, 26, 28, 29

[56] References Cited

UNITED STATES PATENTS

| | | | |
|---|---|---|---|
| 3,320,409 | 5/1967 | Larrowe | 235/197 |
| 3,649,819 | 3/1972 | Waller | 235/151 |
| 3,660,833 | 5/1972 | Blevwas | 340/324 A |
| 3,742,484 | 6/1973 | Rosenthal | 235/198 X |

*Primary Examiner*—Joseph F. Ruggiero

*Attorney, Agent, or Firm*—Howard P. Terry; Albert B. Cooper

[57] ABSTRACT

A vector generator for cathode ray tube displays in which capacitors adapted to be coupled to the X and Y deflection inputs respectively of the cathode ray tube are linearly charged through respective diode bridges from current sources whose output currents are controlled in accordance with the X and Y vector drawing rates required to provide a uniform drawing speed for all vector angles. The end position coordinates of the vectors are provided from digital-to-analog converters to the respective diode bridges and the capacitors are charged from the current sources until the voltages on the capacitors equal the voltages provided from the position digital-to-analog converters respectively.

10 Claims, 3 Drawing Figures

CONTROLLED CURRENT VECTOR GENERATOR FOR CATHODE RAY TUBE DISPLAYS

BACKGROUND OF THE INVENTION

1. Field of the Invention

The present invention relates to cathode ray tube displays of the stroke or vector writing variety wherein patterns are drawn on the screen of a cathode ray tube by concatenated series of vectors. Such a system is also known as a calligraphic pattern generator. The present invention relates specifically to a vector generator for such systems.

2. Description of the Prior Art

In the prior art, digital techniques have been utilized to generate the X and Y deflection voltages for the drawing of vectors in cathode ray tube displays. An example of such a digital vector generator utilizes a binary rate multiplier, an up-down counter, and a digital-to-analog converter for each of the X and Y axes of the cathode ray tube. A digital number representative of the desired drawing rate for each of the axes is applied to the appropriate binary rate multiplier whose input receives a fixed frequency clock pulse train. The output of the binary rate multiplier, which is applied to the up-down counter, is therefore a clock pulse train of frequency proportional to the desired drawing rate for the axis. The output of the counter is applied to the digital-to-analog converter whose output provides the deflection voltage to the associated axis of the cathode ray tube. The output of each binary rate multiplier is also applied to a ccounter that is preloaded with length data for the vector. The outputs of both the X and Y length counters provide signals to logic circuitry to signify that the vector has been completed. The outputs of the X and Y digital-to-analog converters are applied to the corresponding deflection means of the cathode ray tube via sample and hold circuits under control of the logic circuitry. Such digital vector generators, although having the advantage of accuracy of vector positioning, suffer the disadvantages that the digitized deflection waveforms do not permit the generation of smooth vectors; the vector generation speed is limited by the number of bits per second that the digital circuits can handle and exceedingly critical and precise timing is required by the control logic circuitry.

Because of the drawing speed requirements of present day cathode ray tube display systems, the digital methods of generating vectors are often inadequate. Additionally, it is desirable to draw smooth vectors rather than the unsmooth vectors provided by the digital techniques. Accordingly, analog methods of generating vectors were developed to obviate the problems associated with the digital techniques but often required many complex stages of circuitry which complexity resulted in distributed errors and noise severely deteriorating the quality of the drawn vectors. Additionally the complexity of the prior art analog designs resulted in high power requirements and severe packaging and space problems as well as excessive design, component and manufacturing costs. Furthermore, prior art approaches to the analog design were subject to severe drift effects.

An example of such a prior art analog vector generator utilizes an open loop integrator principle where digital inputs into X and Y digital-to-analog converters provide voltages proportional to the desired drawing rates. These voltages are applied to integrators whose outputs provide the X and Y deflection voltages for the cathode ray tube. A counter loaded with digital length data controls the length of the vector. Such a prior art arrangement is subject to severe errors and drift.

Another example of a prior art analog vector generator utilizes a track and hold circuit, a position digital-to-analog converter and a multiplying digital-to-analog converter for each of the X and Y axes of the cathode ray tube. The input to the track and hold circuit is first switched to the output of the position digital-to-analog converter, which has applied as an input thereto digital data representative of the initial position of the vector to be drawn. Control circuitry then switches the input of the track and hold circuit to the output of the multiplying digital-to-analog converter which has applied as inputs thereto a ramp waveform and digital data representative of the desired drawing rate, by which data the ramp waveform is multiplied. The ramp waveform is applied to both the X and the Y axis circuitry as well as to a comparator to which the output of a length digital-to-analog converter is applied for controlling the lengths of the vectors to be drawn. Logic circuitry controls the timing for the track and hold circuits and the switching of the inputs thereto as well as the timing for the generator that provides the ramp waveform. The numerous levels of analog circuitry create serious error and noise problems as well as resulting in excessive cost.

SUMMARY OF THE INVENTION

The present invention obviates the above disadvantages by providing a vector generator utilizing analog techniques that retain the accuracy of vector positioning and the resolution of a digital design yet providing the speed and smooth straight vectors required for present day cathode ray tube display systems. Additionally, the invention provides noise-free signals and further provides packaging and power that is reduced by approximately one-half relative to that of the digital designs and by about two-thirds compared to that of typical prior art analog methods. The analog generation of the X and Y axis deflection waveforms has the advantage of producing continuous vectors on cathode ray tube displays and yet requires only one stage of analog circuitry.

The vector generator of the present invention includes X and Y capacitors adapted to be coupled to the X and Y deflection means of the cathode ray tube for storing X and Y analog voltages, respectively, representative of the current beam position. Means are included for providing additional X and Y analog voltages representative of a new beam position to which a vector is to be drawn from the current beam position. Further means are included for providing X and Y analog rate signals representative of the X and Y drawing rates of the vector so as to provide a uniform drawing rate for vectors at all angles. The X and Y rate signals are applied to controlled current sources for providing respective currents controlled in accordance with the rate signals. Current control circuits coupled to the X and Y capacitors and to the controlled current sources and coupled to receive the X and Y position signals directs controlled currents into the respective capacitors from the controlled current sources until the voltages stored by the capacitors are rendered equal to the position voltages, respectively, thereby drawing a vector from the current beam position to the new beam position at a uniform drawing rate for all vector angles.

DESCRIPTION OF THE PREFERRED EMBODIMENT

Figure 1:
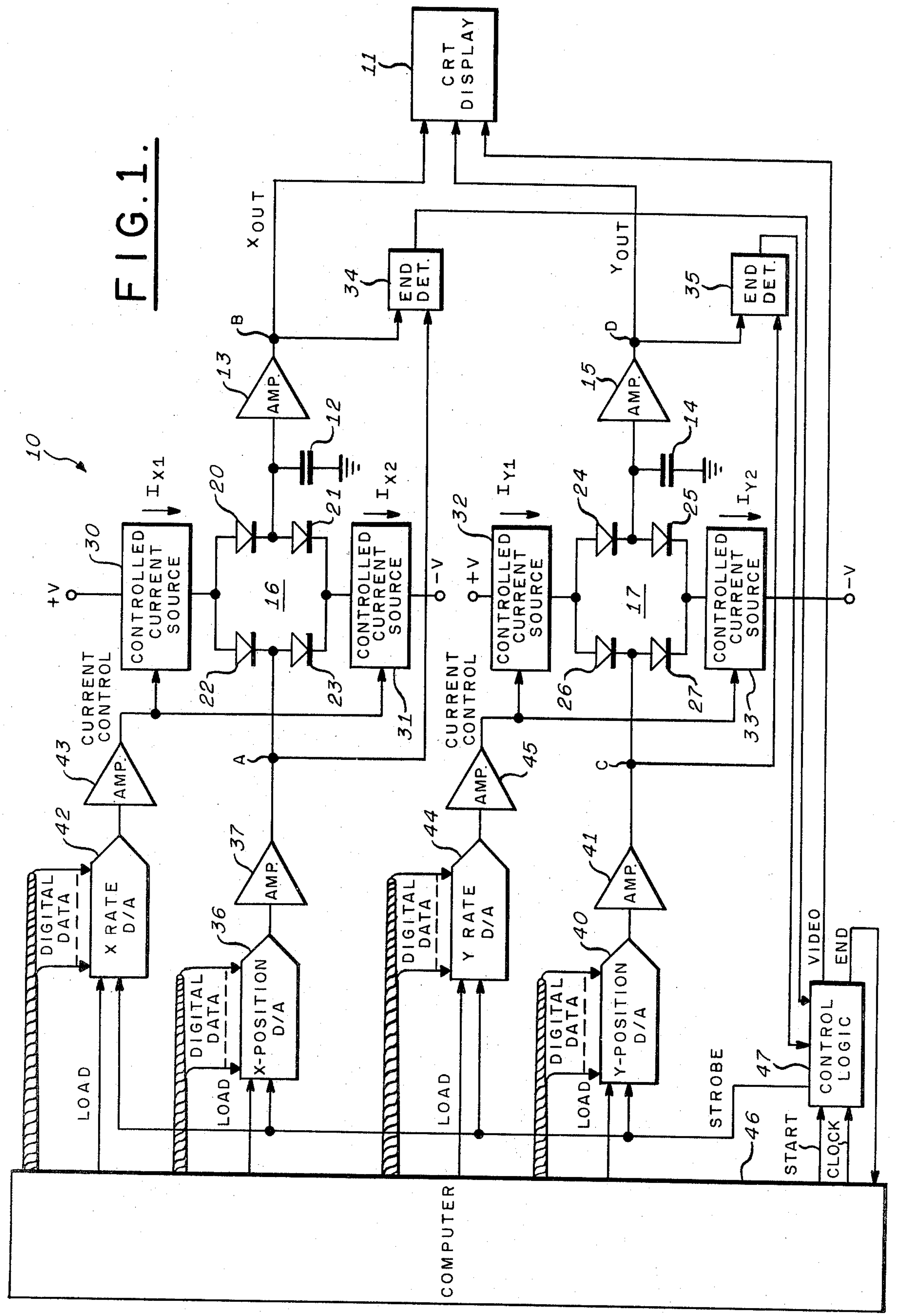
FIG. 1 is a schematic block diagram of the preferred embodiment of a controlled current vector generator in accordance with the invention.

Referring to FIG. 1, a vector generator 10 for drawing straight line vector or stroke patterns on a cathode ray tube display 11, is illustrated. A capacitor 12 provides the X deflection voltage to the X deflection means of the cathode ray tube 11 via an isolation amplifier 13. Similarly a capacitor 14 provides the Y deflection voltage to the Y deflection means of the cathode ray tube 11 via an isolation amplifier 15. The outputs of the amplifiers 13 and 15 are designated as points B and D, respectively, for convenience. The voltages across the capacitors 12 and 14 determine the X and Y coordinates, respectively, of the current beam position of the cathode ray tube 11.

The capacitors 12 and 14 are connected to respective diode bridges 16 and 17. The diode bridge 16 is comprised of diodes 20, 21, 22 and 23 and the bridge 17 is comprised of diodes 24, 25, 26 and 27. The capacitor 12 is connected to the junction between the cathode of the diode 20 and the anode of the diode 21 and the capacitor 14 is connected to the junction between the cathode of the diode 24 and the anode of the diode 25. A controlled current source 30 is connected to the junction between the anodes of the diodes 20 and 22 to provide a positive current, $I_{X1}$, to the diode bridge 16 and a controlled current source 31 is connected to the junction between the cathodes of the diodes 21 and 23 to provide a negative current $I_{X2}$ to the bridge 16. Each of the controlled current sources 30 and 31 provides a fixed current of magnitude determined by the voltage applied to its input. Such controlled current sources may be instrumented by conventional voltage to current converters of a type to be later described. In a similar manner, sources 32 and 33 provide controlled currents $I_{Y1}$ and $I_{Y2}$ respectively to the bridge 17. The inputs to the sources 30 and 31 are commonly connected and the sources are configured such that the absolute magnitude of the current $I_{X1}$ is equal to the absolute magnitude of the current $I_{X2}$. In a similar manner the inputs to the sources 32 and 33 are connected together such that the absolute magnitudes of the currents $I_{Y1}$ and $I_{Y2}$ are equal to each other.

The junction between the cathode of the diode 22 and the anode of the diode 23 of the bridge 16 is designated as point A and the junction between the cathode of the diode 26 and the anode of the diode 27 of the bridge 17 is designated as point C. Quiescently when the voltage at point A is equal to the voltage at the point B, all of the diodes 20–23 of the bridge 16 are conductive and the controlled current flows from +V, through the source 30, through the diode bridge 16, through the source 31 to −V. Under the conditions where the voltage at point A is equal to the voltage at point B the current divides equally between the two legs of the bridge 16. When, however, the voltage at point A is more positive than the voltage at point B, diodes 21 and 22 are reverse biased and the current $I_{X1}$ flows from the source 30 through the diode 20 to linearly charge the capacitor 12 until the voltage at point B is rendered equal to the voltage at point A at which time all four diodes 20–23 are again rendered conductive thereby causing the current to again divide between the two legs of the bridge 16 thereby restoring the quiescent condition of the voltage at the point A equalling the voltage at the point B. When the voltage at the point A becomes more negative than the voltage at the point B, the diodes 20 and 23 are reverse biased and the negative current $I_{X2}$ flows from the capacitor 12 through the diode 21 into the controlled current source 31 until again the voltage at point B is rendered equal to the voltage at point A at which time the quiescent condition of the bridge 16 is again restored.

In a similar manner with regard to the bridge 17 when under quiescent conditions the voltage at the point C is equal to the voltage at the point D, the controlled current flows from the source 32 through the bridge 17, dividing between the two legs thereof, and then into the source 33. When the voltage at the point C is more positive than the voltage at the point D, the diodes 25 and 26 are reverse biased and the current $I_{Y1}$ provided by the source 32 flows through the diode 24 to linearly charge the capacitor 14 until the voltage at the point D is rendered equal to the voltage at the point C. When the voltage at the point C is more negative than the voltage at the point D, the diodes 24 and 27 are reverse biased and the controlled current $I_{Y2}$ flows from the capacitor 14 through the diode 25 to the source 33 until again the voltage at the point D is rendered equal to the voltage at the point C. It will be appreciated that the bridges 16 and 17 function as current control circuits for directing the controlled currents from the sources 30–33 into the capacitors 12 and 14.

An end detector 34 having inputs connected to the points A and B respectively provides an output when the voltages at the points A and B are equal to each other. Similarly, an end detector 35 having inputs connected to the points C and D provides an output when the voltages at the points C and D are equal to each other. The end detectors 34 and 35 may be instrumented by conventional voltage comparator circuits of a type well known in the art.

The voltage to point A is provided from an X position digital-to-analog converter 36 through an isolation amplifier 37. In a similar manner, the voltage to the point C is provided by a Y position digital-to-analog converter 40 via an isolation amplifier 41. The current control voltage applied to the controlled current sources 30 and 31 is provided by an X rate digital-to-analog converter 42 via an isolation amplifier 43. Similarly, the current control voltage applied to the controlled current sources 32 and 33 is provided by a Y rate digital-to-analog converter 44 via an isolation amplifier 45.

In the use of the vector generator 10 the digital data signals applied to the converters 36, 40, 42 and 44 are provided from a system computer schematically illustrated at 46. The computer 46 also provides load control signals for inserting the appropriate digital data words into the respective converters 36, 40, 42 and 44. The computer 46 in addition provides start and clock signals to control logic 47. The control logic 47 also receives inputs from the end detectors 34 and 35 and comprises conventional logic circuit arrangements for providing a video signal to the cathode ray tube 11, a strobe signal to the converters 36, 40, 42 and 44, as well as an end signal to the computer 46 in accordance with the functions to be described hereinafter.

The vector generator 10 is most advantageously utilized in drawing concatenated series of vectors forming patterns such as alphanumeric characters or graphical symbols. Parameters with respect to one such vector are understood by reference to FIG. 2. The X and Y axes of the cathode ray tube coordinate system are illustrated with a typical vector 60 drawn with respect thereto. The vector 60 is defined by an initial position ($X_1$, $Y_1$) and a final position ($X_2$, $Y_2$) and the angle $\phi$ at which the vector is disposed with respect to the horizontal X axis. As indicated by the legend, the X and Y drawing rates to provide a uniform resultant drawing rate for vectors at all angles $\phi$ is proportional to $I_0 \cos \phi$ and $I_0 \sin \phi$ in a manner to be further described.

Figure 2:
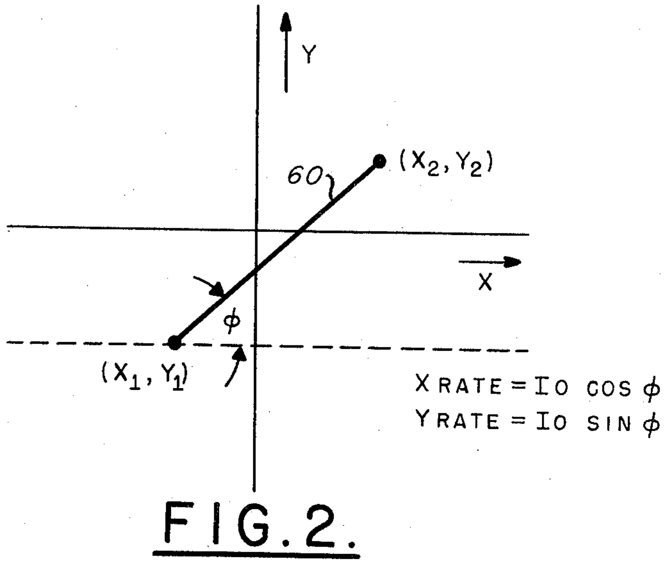
FIG. 2 is a Cartesian coordinate diagram illustrating pertinent parameters with regard to the vector generation of the present invention.

Referring now to FIGS. 1 and 2, the vector generator 10 draws the vector 60 on the cathode ray tube 11 in the following manner. The initial position ($X_1$, $Y_1$) of the vector 60 is determined by the final position of the previous vector. The voltages across the capacitors 12 and 14 represent the $X_1$ and $Y_1$ coordinates respectively of this position. The computer 46 loads the X position digital-to-analog converter 36 with the $X_2$ coordinate of the vector end point and loads the Y position digital-to-analog converter 40 with the $Y_2$ coordinate of the end point. The computer 46 also loads the X rate digital-to-analog converter 42 with a number proportional to cos $\phi$ and loads the Y rate digital-to-analog converter 44 with a number proportional to sine $\phi$. The computer then provides the start signal to the control logic 47 and thereafter the vector generator 10 draws the vector 60 independently of the computer 46. In response to the start signal, the control logic 47 provides the strobe signal to enable the converters 36, 40, 42 and 44. Since, in the example of drawing the vector 60, $X_2$ is more positive than $X_1$ and $Y_2$ is more positive than $Y_1$, the digital-to-analog converter 36 provides the $X_2$ voltage to point A that is more positive than the $X_1$ voltage at point B and the digital-to-analog converter 40 provides the $Y_2$ voltage to point C that is more positive than the $Y_1$ voltage at point D. Under these conditions, the controlled current source 30 provides the current $I_{X1}$ through the diode 20 to linearly charge the capacitor 12 until the voltage at point B equals the $X_2$ voltage at point A. The charging rate for the capacitor 12 and hence the X coordinate vector drawing rate is controlled by the current $I_{X1}$ which is rendered proportional to cosine $\phi$ by reason of the signal applied to the source 30 from the converter 42. In a similar manner the controlled current source 32 provides the current $I_{Y1}$ proportional to sine $\phi$ through the diode 34 to linearly charge the capacitor 14 until the voltage at point D equals the $Y_2$ voltage at point C. Concurrently with providing the strobe signal to the converters 36, 40, 42 and 44, the control logic 47 enables the video line to the cathode ray tube 11 to unblank the beam so that the vector 60 may be drawn from the coordinates ($X_1$, $Y_1$) to the coordinates ($X_2$, $Y_2$) as the capacitors 12 and 14 charge toward the final position voltages at the points A and C. When the voltage at the point B is rendered equal to the voltage at the point A and the voltage at the point D is rendered equal to the voltage at the point C, the end detectors 34 and 35 are enabled which causes the control logic 47 to disable the video line to the cathode ray tube 11 thereby turning off the beam. In response to the signals from the end detectors 34 and 35, the control logic 47 also provides a signal to the computer 46 on the end line signalling that the beam has reached the end point of the current vector and the vector generator 10 is in a quiescent condition ready for the drawing of the next vector whose initial position will be the same as the final position of the last drawn vector.

The requirement of constant writing speed for all vector angles $\phi$ to provide vectors of uniform intensity irrespective of the angle is achieved by inserting the appropriate cosine $\phi$ and sine $\phi$ values into the converters 42 and 44, respectively, to control the currents from the sources 30–33 so as to achieve the appropriate values for the X and Y drawing rates. These rates are related to the charge on the capacitors 12 and 14 by the formula $I = C\,(dV/dT)$ where I is the current into the capacitors, C is the capacitance values thereof and $(dV/dT)$ is the rate of voltage change across the capacitors. Since $(dV/dT)$ determines the drawing rate of the vector, the current I is linearly proportional to the drawing rate. Since the current, and hence the X drawing rate, provided by the X axis controlled current sources 30 and 31 is rendered proportional to cosine $\phi$ and the current, and hence the Y drawing rate, provided by the Y axis controlled current sources 32 and 33 is rendered proportional to sine $\phi$, the resultant drawing rate for any vector will be constant. This can be seen by considering the equations $$X_{rate} = I_0 \cos \phi$$
$$Y_{rate} = I_0 \sin \phi$$

where $I_0$ is the normalized current provided by the controlled current sources 30–33. Since the resultant drawing rate for any vector is the square root of the sum of the squares of the X rate and the Y rate, the resultant drawing rate for any vector equals $$(I_0^2\cos^2\phi + I_0^2\sin^2\phi)^{1/2} = I_0$$

where $$|Y_2-Y_1/X_2-X_1| = |\Delta Y/\Delta X| = \tan \phi$$

Therefore, the resultant drawing rate for any vector will be proportional to the normalized current $I_0$ thus generating vectors at any angle with uniform intensity.

It will be appreciated that the polarities shown for the diode bridges 16 and 17 as well as for the sources 30–33 are merely exemplary, other arrangements of polarities being within the scope of the invention.

Figure 3:
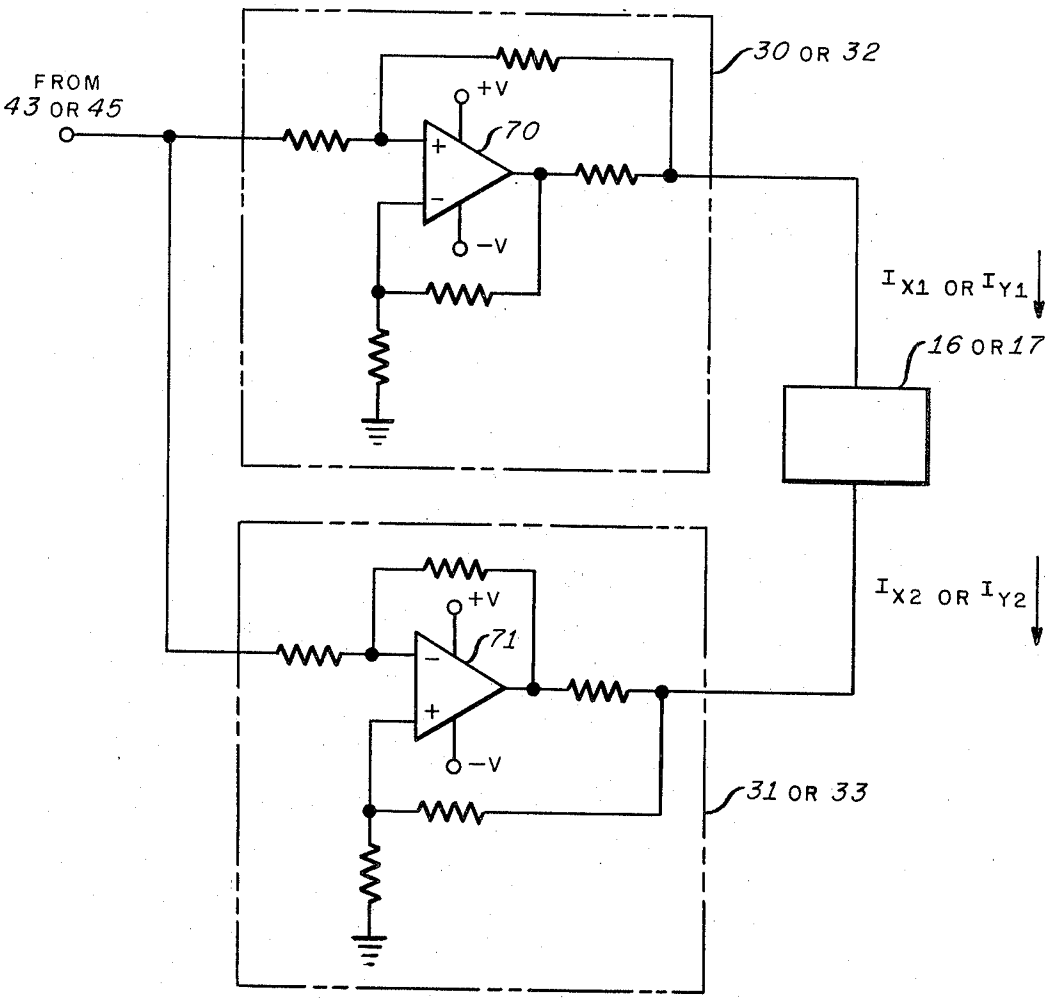
FIG. 3 is a schematic wiring diagram of the controlled current sources of FIG. 1.

It will also be appreciated that the invention resides in the controlled current vector generator 10 which receives its inputs at the converters 36, 40, 42 and 44 as well as at the control logic 47 from, for example, a computer 46. The computer 46 is a conventional portion of the display system in which the vector generator 10 is utilized. For example, the display system may be an alphanumeric symbol generator which draws alphanumeric characters in response, for example, to the conventional ASCII codes therefor. The computer 46 may then include read-only memories storing all of the end points and rates for the variety of vectors that constitute the symbols, which numbers may be called out in sequence in response to the appropriate input codes. The vector generator 10 may also be utilized in an animated display such as a moving map display for an aircraft area navigation system. In such a system the computer may calculate the vector end points as well as the required sines and cosines for drawing the vectors on the basis of data provided by flight sensors. Such coordinate and sine and cosine computations may be performed by the computer on the basis of conventional program sub-routines well known in the art. Referring now to FIG. 3, in which like reference numerals indicate like components with respect to FIG. 1, details of the controlled current sources 30–33 are illustrated. Each of the sources 30–33 may conveniently be implemented by a conventional operational amplifier voltage-to-current converter that provides a constant current output of magnitude proportional to the voltage input. For example, each of the controlled current sources 30 and 32 may be implemented as illustrated utilizing an operational amplifier 70 and each of the sources 31 and 33 may be implemented utilizing an operational amplifier 71. Since the voltages provided from the amplifiers 43 or 45 (FIG. 1) are proportional to sine $\phi$ and cosine $\phi$, the currents provided by the controlled current sources 30–33 will similarly be proportional to sine $\phi$ and cosine $\phi$ as required to provide the desired uniform drawing rates. Because the non-inverting input to the amplifier 70 is utilized for the current control signal and the inverting input to the amplifier 71 is used for the current control signal, the current flows from the amplifier 70 through the diode bridge 16 or 17 and into the output of the amplifier 71 to return to the −V power supply generally in the manner described above. Since the operational amplifier voltage-to-current converters illustrated in FIG. 3 are of conventional design, further description thereof will not be provided herein for brevity.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A vector generator for a cathode ray tube display having X and Y deflection means, comprising X and Y capacitor means including means for coupling said X and Y capacator means to said X and Y deflection means for storing first X and Y analog voltages, respectively, for determining the current beam position of said cathode ray tube, X and Y position means for providing second X and Y analog voltages, respectively, representative of a new beam position to which a vector is to be drawn from said current beam position, X and Y rate means for providing X and Y analog rate signals, respectively, representative of the X and Y drawing rates of said vector to provide a uniform drawing rate, controlled current source means coupled to said X and Y rate means, respectively, for providing respective currents controlled in accordance with said X and Y rate signals, and current control means coupled to said capacitor means, position means and controlled current source means for directing said controlled currents into said respective capacitor means from said controlled current source means until said first voltages are rendered equal to said second voltages respectively, whereby a vector is drawn from said current beam position to said new beam position at a uniform drawing rate for all vectors.

2. The generator of claim 1 in which said X and Y position means comprises digital-to-analog converter means responsive to X and Y digital position signals for providing said second X and Y analog voltages in accordance with said digital position signals, respectively.

3. The generator of claim 1 in which said X and Y rate means comprises digital-to-analog converter means responsive to X and Y digital rate signals for providing said X and Y analog rate signals in accordance with said digital rate signals respectively.

4. The generator of claim 3 in which said X and Y digital rate signals are proportional to the cosine and sine, respectively, of the angle between the vector to be drawn and the horizontal axis of the screen of said cathode ray tube display.

5. The generator of claim 1 in which said X and Y capacitor means comprises X and Y capacitors with means for coupling said capacitors to said X and Y deflection means respectively, and said current control means comprises X and Y diode bridges coupled to said X and Y capacitors and to said X and Y position means respectively.

6. The generator of claim 5 in which said controlled current source means comprises positive and negative X controlled current sources coupled to said X diode bridge and to said Y rate means for providing positive and negative controlled currents, respectively, to said X diode bridge for charging said X capacitor until said first X analog voltage is rendered equal to said second X analog voltage, and positive and negative Y controlled current sources coupled to said Y diode bridge and to said Y rate means for providing positive and negative controlled currents respectively to said Y diode bridge for charging said Y capacitor until said first Y analog voltage is rendered equal to said second Y analog voltage.

7. The generator of claim 6 in which each said diode bridge comprises four diodes and four junctions therebetween, a first and a second junction being between like electrodes of said diodes, and a third and a fourth junction being between unlike electrodes of said diodes, said associated positive and negative controlled current sources being coupled to said first and second junctions respectively, said associated capacitor and said associated position means being coupled to said third and fourth junctions respectively.

8. The generator of claim 1 further including end detector means coupled to said capacitor means and to said position means for providing an end signal when said first voltages are rendered equal to said second voltages respectively.

9. A vector generator for a cathode ray tube display having X and Y deflection means, comprising X and Y capacitors with means for coupling said capacitors to said X and Y deflection means for storing first X and Y analog voltages respectively for determining the current beam position of said cathode ray tube, X and Y position digital-to-analog converters responsive to X and Y digital position signals for providing second X and Y analog voltages in accordance with said digital position signals, respectively, said second analog voltages being representative of a new beam position to which a vector is to be drawn from said current beam position, X and Y rate digital-to-analog converters responsive to X and Y digital rate signals proportional to the cosine and sine, respectively, of the angle between the vector to be drawn and the horizontal axis of the screen of said cathode ray tube display for providing X and Y analog rate signals in accordance with said digital rate signals, respectively, said analog rate signals thereby being representative of the X and Y drawing rates of said vector to provide a uniform drawing rate for all vector angles, positive and negative X controlled current sources coupled to said X rate digital-to-analog converter for providing positive and negative currents respectively, in accordance with said X rate signal, positive and negative Y controlled current sources coupled to said Y rate digital-to-analog converter for providing positive and negative currents, respectively, controlled in accordance with said Y rate signal, X and Y diode bridges coupled to said X and Y capacitors, to said X and Y position digital-to-analog converters and to said X and Y controlled current sources respectively for directing said respective controlled currents into said respective capacitors from said respective controlled current sources for linearly charging said respective capacitors until said first voltages are rendered equal to said second voltages respectively, whereby a vector is drawn from said current beam position to said new beam position at a uniform drawing rate for all vector angles.

10. The generator of claim 9 in which each said diode bridge comprises four diodes and four junctions therebetween, a first and a second junction being between like electrodes of said diodes, and a third and a fourth junction being between unlike electrodes of said diodes, said associated positive and negative controlled current sources being coupled to said first and second junctions respectively, said associated capacitor and said associated position digital-to-analog converter being coupled to said third and fourth junctions respectively.

* * * * *